Patented Apr. 9, 1935

1,997,213

UNITED STATES PATENT OFFICE 1,997,213

PROCESS FOR THE PREPARATION OF ALKYL ARYL KETONES

Philip H. Groggins and Ray H. Nagel, Washington, D. C., assignors to Henry A. Wallace, Secretary of Agriculture of the United States of America No Drawing. Application September 21, 1934, Serial No. 744,944

5 Claims. (Cl. 260—131)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government, for governmental purposes, without payment to us of any royalty thereon.

The present invention relates to alkyl aryl ketones, and more particularly to their preparation from the residues which remain after treating aliphatic acid anhydrides with anhydrous aluminum chloride. Hitherto, alkyl aryl ketones have been made by condensing carboxylic acids or their acid chlorides or anhydrides with aromatic compounds in the presence of aluminum chloride.

We have discovered that aluminum chloride reacts with aliphatic carboxylic acids and their anhydrides to form one molecular proportion each of a volatile acid chloride and a non-volatile residue comprising the aluminum chloride salt of the carboxylic acid employed.

More particularly, we have discovered that the residual aluminum chloride complex of the carboxylic acid can be made to enter into Friedel and Crafts reactions for the preparation of alkyl aryl ketones. Our novel process thus makes possible the production of an acid chloride and the utilization of the residue for the manufacture of useful alkyl aryl ketones.

When acetic anhydride is treated with anhydrous aluminum chloride at room or slightly elevated temperatures, the following reaction takes place:

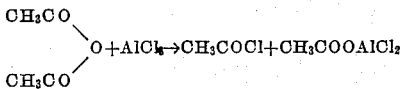

The acetyl chloride formed is distilled off at 50° to 55° C., a yield of 70 to 75 per cent of theory, based on one acyl group, thus being obtained. The distilled acyl halide may be either recovered for use in the arts or may be led into a vessel and made to react for the preparation of ketones.

Now, we have discovered that the residue remaining after the removal of the acid chloride can be made to react with aromatic compounds for the preparation of alkyl aryl ketones. It is clear that the utilization of this residue thus provides an economical procedure for the preparation of acid chlorides and alkyl aryl ketones.

The following examples will serve to illustrate the nature of our invention, although it is not to be limited thereby.

Example I

Thirty parts by weight of acetic anhydride are treated in a distilling flask with forty parts of granular anhydrous aluminum chloride. The reaction starts immediately, and acetyl chloride distills off at about 51° C. The distillate is collected in a receiver which is surrounded by ice or brine, and which is fitted with an efficient reflux condenser. It is found desirable to install a calcium chloride drying tube at the upper end of the reflux condenser to prevent the ingress of moisture. A slight heating is desirable to insure the complete removal of the volatile acetyl chloride, B. P. 51° C. The yield of acyl derivative thus obtained is 18 parts by weight or 78 per cent of the theoretical. The residue in the flask is an orange-colored complex of aluminum chloride and acetic acid.

To the residue thus obtained, there is added 80 parts of chlorobenzene and 40 parts of anhydrous aluminum chloride. This mixture is heated at 100° C. for 6 hours, and after hydrolyzing with iced mineral acid, a yield of 75 per cent of 4-chloroacetophenone is obtained, based on one acyl group.

In the preceding experiment, 40 parts by weight of nitrobenzene or other inert solvents may be added to the initial charge, and a fluid, easily agitated mixture is thereby obtained without any substantial variation in the yields of acetyl chloride and 4-chloroacetophenone.

Example II

This shows how the acetyl chloride and the residue may be employed for the preparation of different alkyl aryl ketones according to the Friedel and Crafts reaction. In a distilling flask are placed 74 parts by weight of granular anhydrous aluminum chloride and 51 parts of acetic anhydride. The acetyl chloride which is distilled off on warming to 50–60° C. is led to another flask, No. 2, fitted with a stirrer and reflux condenser, and which contains 74 parts of aluminum chloride and 112.5 parts of chlorobenzene. As soon as all of the acetyl chloride is distilled over, the connection between the two flasks is broken or closed. Flask No. 2, containing chlorobenzene, aluminum chloride and distilled acetyl chloride, is warmed for 6 hours at 80° C. From this reaction mass 4'-chloroacetophenone is obtained upon hydrolysis and distillation in about 60–70 per cent yield, based on the acetic anhydride used.

To flask No. 1, containing the residual aluminum chloride salt of acetic acid, there is added 92 parts by weight of toluene and 74 parts of additional aluminum chloride. This charge is then warmed at 100° C. for 10 hours. On hydrolysis and distillation 4-methylacetophenone is obtained in about 70 per cent yield.

It is clear that our discovery makes possible the simultaneous production of two ketones. It is furthermore apparent that the increase in the total yields of ketone by our novel method is approximately 50 per cent above those obtained by previously known methods.

In preparing alkyl aryl ketones by our invention, aluminum bromide may be used instead of the corresponding chloride. Likewise, ferric halides may be substituted for the aluminum condensing agents. Instead of treating acetic anhydride, other aliphatic anhydrides, such as propionic and butyric anhydrides, may be employed. We have also discovered that the aliphatic carboxylic acids themselves can be used instead of their anhydrides, but under such circumstances the quantity of aluminum chloride required is considerably greater and the yields of recovered acyl halide are not quite as high.

The temperatures at which the reaction is carried out vary directly with the molecular weight of the aliphatic acid anhydride employed. Generally temperatures of 30° C. to 180° C. will suffice for the anhydrides of acetic to valeric acids.

As many apparent and widely different embodiments of this invention can be made without departing from the spirit thereof, it is to be understood that we do not limit ourselves to the foregoing examples or descriptions, except as indicated in the following claims.

We claim:

1. A process for the preparation of alkyl aryl ketones which comprises treating a member of the group consisting of aliphatic carboxylic acids and their anhydrides with aluminum halides, removing the volatile acyl halide thus formed, and then reacting the residue with an aromatic compound and an aluminum halide.

2. A process for the preparation of alkyl aryl ketones which comprises treating a member of the group consisting of aliphatic carboxylic acids and their anhydrides with aluminum chloride, removing the volatile acid chloride thus formed, and then reacting the residue with an aromatic compound and aluminum chloride.

3. A process, according to claim 2, in which ferric chloride is used instead of aluminum chloride.

4. A process for the preparation of 4-methylacetophenone which comprises treating acetic anhydride with aluminum chloride at 30° to 100° C., removing the volatile acetyl chloride thus formed, and then reacting the residue with toluene and aluminum chloride at 100° C.

5. A process for the preparation of 4-chloropropiophenone which comprises treating propionic anhydride with aluminum chloride at 80° to 100° C., removing the volatile propionyl chloride thus formed, and then reacting the residue with chlorobenzene and aluminum chloride at 130° C.

PHILIP H. GROGGINS.
RAY H. NAGEL.